…

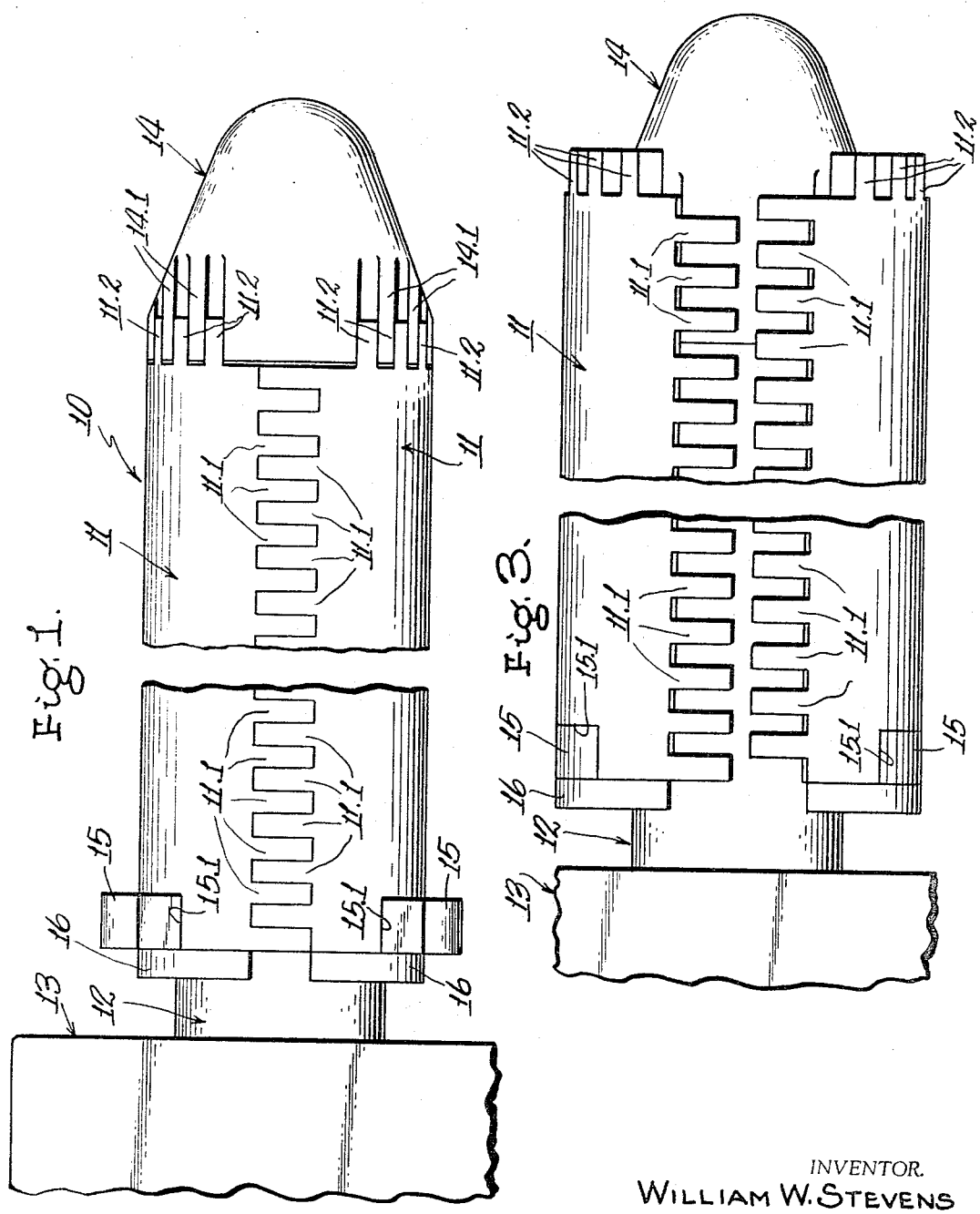

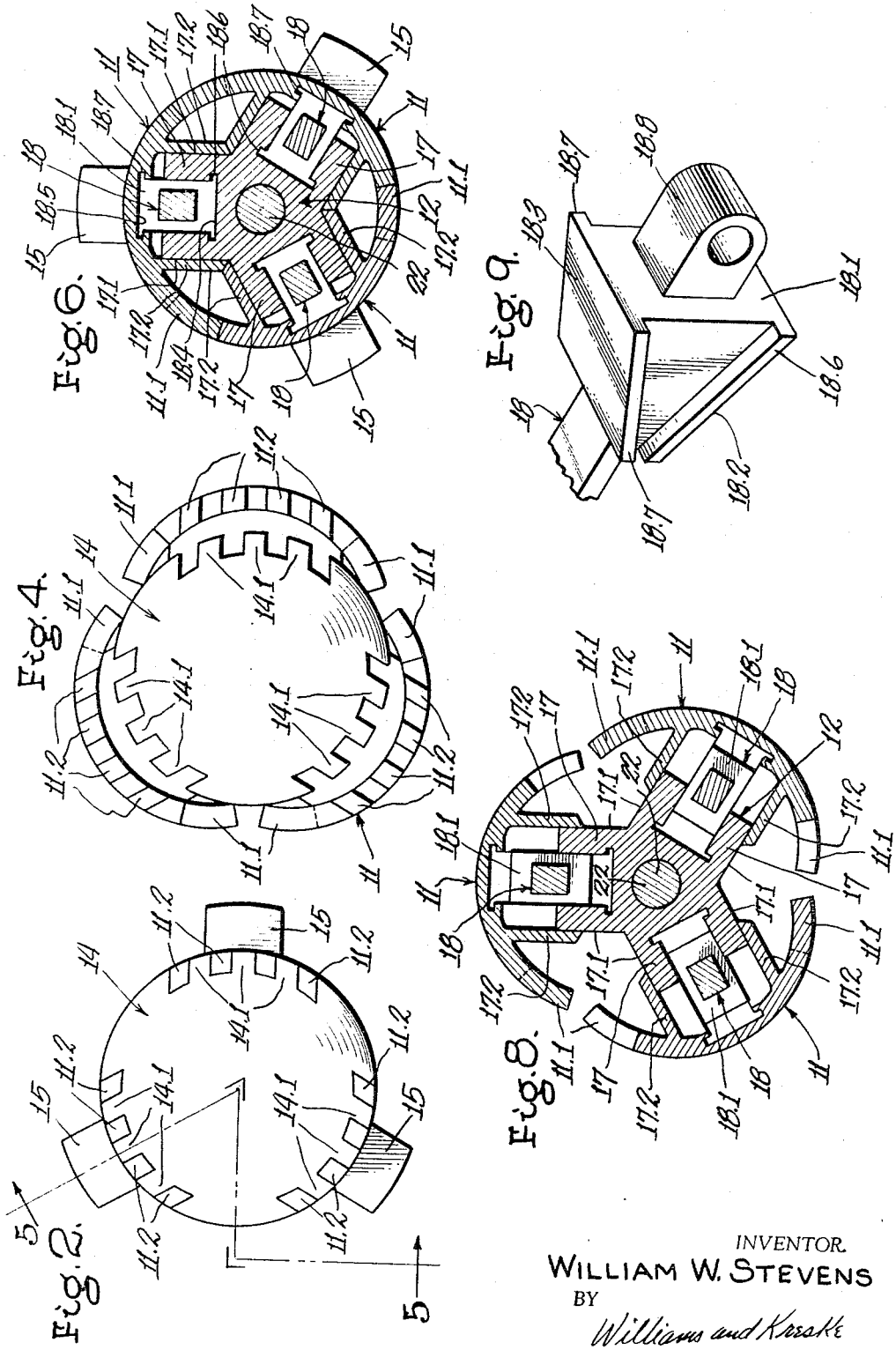

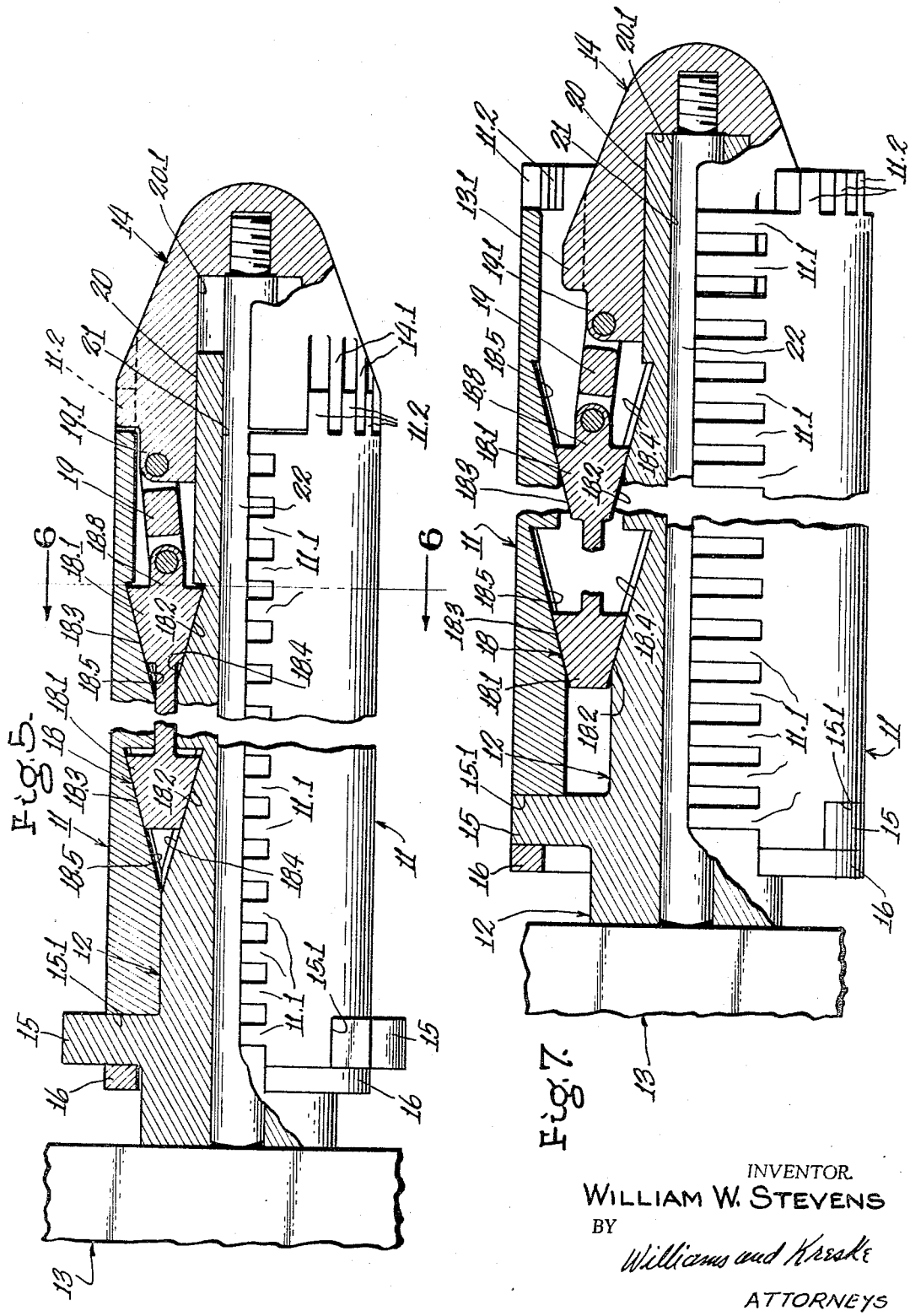

3,319,902
EXPANSIBLE-CONTRACTABLE REEL
William W. Stevens, Salem, Ohio, assignor to The McKay Machine Company, Youngstown, Ohio
Filed Sept. 9, 1965, Ser. No. 486,029
28 Claims. (Cl. 242—72.1)

The present invention relates to expansible-contractable reels, especially of the cantilever type, and the principal object of the invention is to provide new and improved reels of the character described.

While many types of expansible-contractable reels have heretofore been devised, most have been excessively complex, limited in strength, high in maintenance, and limited in their accommodation to coils with differently sized central bores.

Reels constructed in accordance with the present invention, however, are simpler, stronger, less troublesome, and more flexible in usage than those heretofore known. These and other advantages will readily become apparent from a study of the following description and from the drawings appended hereto.

In the drawings accompanying this specification and forming a part of this application, there is shown, for purpose of illustration, an embodiment which the invention may assume, and in these drawings:

FIGURE 1 is a broken, side elevational view of a reel of the present invention shown in contracted position, FIGURE 2 is an end elevational view of the contracted reel, FIGURE 3 is a view similar to FIGURE 1 but showing the reel in expanded position, FIGURE 4 is an end elevational view of the expanded reel, FIGURE 5 is a view partially in section and partially in elevation, generally corresponding to the line 5—5 of FIGURE 2, FIGURE 6 is a transverse sectional view generally corresponding to the line 6—6 of FIGURE 5, FIGURE 7 is a view similar to FIGURE 5 but showing the reel in expanded position, and FIGURE 8 is a view similar to FIGURE 6 but showing the reel in expanded position, and FIGURE 9 is an enlarged, fragmentary perspective view of a detail.

With reference to FIGURE 1, there is shown an expansible-contractable reel 10 of the cantilever type. In brief, reel 10 comprises a plurality, herein shown to be three, of reel segments 11 each forming a portion of the reel periphery. Reel segments 11 are carried by a shaft 12 which is rotatably supported in overhanging, or cantilever, fashion by a suitable base 13. Although not shown, since it forms no part of the present invention, means may be provided for rotating the shaft 12 and/or for impeding its rotation as required. In use, the reel of the present invention is inserted into the central bore of, for example, a coil of metal strip or the like to be supported and then expanded into gripping relation therewith. The strip may then be unwound from the now rotatably supported coil and fed into the usual strip processing apparatus.

As best seen in FIGURES 1 and 6, the present reel is formed of three elongated, transversely arcuate segments 11 each forming one-third of the reel periphery. In order to prevent the formulation of a large gap between adjoining segments when they are shifted radially outwardly to the reel-expanded position seen in FIGURE 3, adjoining segments are designed to overlap each other when they are in the contracted position seen in FIGURE 1. This is effectuated by forming teeth 11.1 along the adjoining margins of the segments 11, respective teeth being axially offset so that the teeth of one segment fit between the teeth of the adjoining segment.

In order to facilitate insertion of the collapsed reel 10 into the bore of a coil, see FIGURES 1 and 2, especially when such bore is but slightly larger in diameter than that of the contracted reel, the free end of the latter is provided with a sleeve-like, rounded, conical end 14 whose maximum outside diameter is substantially identical with the outside diameter of the reel as formed by the contracted segments 11. To obviate a gap at the juncture of the segments 11 with the end 14, each segment is provided with teeth 11.2 which, when the reel is collapsed, fit between teeth 14.1 formed in the end 14.

Means are provided for preventing axial movement of the arcuate segments 11 and as best seen in FIGURES 1, 2, and 5, shaft 12 adjacent the base 13, is provided with a radially outwardly projecting post 15 for each segment. Each segment is slotted at 15.1 for closely but slidably embracing a respective post and retainers 16 are suitably secured to the ends of the segments to hold the latter closely against respective posts.

Means are also provided for preventing relative rotation between the shaft 12 and the segments 11 while providing for segment radial movement and as best seen in FIGURE 6, the intermediate portion of the shaft underlying the segments is formed to a generally triangular configuration to provide circumferentially spaced, axially extending ribs 17 for respective segments. Each rib 17 provides transversely spaced, oppositely facing guide surfaces 17.1 while each segment has transversely spaced flanges 17.2 providing facing surfaces for close sliding engagement with respective rib surfaces 17.1. From the foregoing, it will be clear that each segment 11 is guided for movement radially inwardly and radially outwardly of the axis of shaft 12 but is confined against any other movement relative to the latter.

Turning now to the means for effecting radial segment movement and with reference to FIGURES 5, 6, and 9, a wedge member 18 is disposed between each segment 11 and the shaft 12. Each wedge member, as herein disclosed, comprises an elongated, axially extending bar having radially enlarged heads 18.1 at axially spaced places therealong. Each head 18.1 has an inclined, radially inwardly facing wedge surface 18.2 and an inclined radially outwardly facing wedge surface 18.3.

Formed in the shaft 12 in each rib 17 are axially spaced, radially outwardly facing, inclined surfaces 18.4 for complementary engagement with respective wedge surfaces 18.2 of respective wedge member. Similarly, each arcuate segment has formed therein axially spaced, radially inwardly facing inclined surfaces 18.5 for complementary engagement with respective wedge surfaces 18.3 of respective wedge members. For a purpose later to appear and as best seen in FIGURE 9, each wedge member head 18.1 has opposed, laterally projecting ribs 18.6, 18.7 at respective wedge surfaces 18.2, 18.3 which engage in respective corresponding grooves (FIGURE 6) in the shaft 12 and in respective segments 11. The right end of each wedge member, in the position of parts shown, is provided with a lug 18.8 to which is pivotally secured one end of respective links 19. The opposite end of each of the links 19 is pivotally secured to suitable lugs 19.1 formed on the end member 14.

As previously mentioned, while the intermediate portion of shaft 12 is provided with the circumferentially spaced, axially extending ribs 17, it is to be noted that the free end of such shaft is rounded at 20 and that the end member 14 is recessed at 20.1 for close sliding fit therewith. A central bore 21 is provided through the shaft 12 and an actuating rod 22 extends therethrough and has one end suitably anchored to the end member 14.

Although not shown, the opposite end of actuating rod 22 may be connected to a fluid cylinder or the like in any well-known manner to provide for axial shifting of the rod without interfering with rotational movement thereof with the shaft 12.

With the reel contracted as seen in FIGURES 1, 2, 5, and 6, a coil of strip or the like which is not shown but which has a central bore, or eye, slightly larger than the contracted diameter of the reel, may readily be slid onto the reel over its free end. Note that the conical reel end 14 will facilitate entry of the reel into the coil bore, or eye, and that because of the toothed overlapping disposition of the end member 14 and the reel segments, 11, there are no shoulders on which the coil can catch to damage the coil or interfere with its assembly with the reel. As best seen in FIGURE 5, it will be noted that the end member 14 is, at this time, positioned in its extreme right-hand position as are the wedge members 18 connected thereto.

With the coil positioned on the contracted reel as above-described, the reel may now be expanded into gripping engagement with the central bore of the coil in the following manner: The fluid cylinder or other device, not shown, may now be actuated to draw the actuating rod 22 to the left. This will cause a corresponding movement of the conical end member 14 along the shaft portion 20. As a result of interconnection of the wedge members 18 to the end member 14 through respective links 19, the wedge members 18 will also be shifted to the left from the reel-contracted position seen in FIGURES 5 and 6 to the heel-expanded position seen in FIGURES 7 and 8.

As the wedge members 18 move to the left, they will slide along the inclined shaft surfaces 18.4 and thus be forced radially outwardly. This radially outward movement of the wedge members will be accommodated by virtue of their link connection 19 with the end member 14 and such radial outward wedge member movement will force respective reel segments 11, with which they are engaged, radially outwardly. Additionally, movement of the wedge members to the left will cause them to move along the inclined surfaces 18.5 of respective reel segments 11 and since the latter are confined against axial movement, such reel segments will be wedged radially outwardly.

From the foregoing, it will be evident that radial outward segment movement will be effected by wedging action as the wedge members slide along respective segment surfaces 18.5 and such segment movement will be compounded by bodily shifting movement of the wedge members as they slide along respective shaft surfaces 18.4. Thus, relatively large, radial outward segment movement can be effectuated by relatively small wedge member axial movement.

As best seen in FIGURE 6, the wedge member ribs 18.6 serve to interlock the wedge members to the shaft 12 so that radial outward movement of the wedge members can only occur in combination with axial movement thereof. Similarly, the wedge member ribs 18.7 serve to interlock the reel segments 11 with respective wedge members so that radial outward movement of the reel segments can only occur in combination with axial wedge member movement.

As a result of the interlocking arrangement between the shaft and the wedge members and between the latter and the reel segments, movement of the conical end member 14 by the actuating rod 22 to the right will reverse the previously described wedge member movement and will contract the reel by drawing the reel segments radially inwardly from the reel-expanded position seen in FIGURES 7 and 8 to the reel-contracted position seen in FIGURES 5 and 6.

While reference has hereinbefore been made to movement of various components to the "left" and to the "right," it is to be understood that such reference is with respect to the position of the parts as herein shown and is not to be considered as limiting the invention in any way. Moreover, while the wedge members 18 are herein disclosed as having two heads 18.1, this is illustrative only and wedges having a greater or lesser number of heads are within the purview of the present invention. Finally, while a reel having three reel segments has herein been disclosed, the invention contemplates reels having a greater or lesser number of segments.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. An expansible-contractable reel comprising a rotatably mounted shaft having a radially outwardly directed surface inclined in one axial direction, means supported on said shaft and movable radially outwardly and radially inwardly thereof to respectively expand and contract said reel, said means having a radially inwardly directed surface inclined in the opposite axial direction from said shaft surface, and a member interposed between said means and said shaft and in engagement with respective inclined surfaces aforesaid, said member being movable axially of said shaft to effect radial movement aforesaid of said means.

2. The construction of claim 1 wherein said member is movable radially inwardly and radially outwardly of said shaft during axial movement thereof.

3. The construction of claim 2 wherein said member has surfaces engaged with and complementary to respective shaft and means surfaces aforesaid.

4. An expansible-contractable reel comprising a rotatably mounted shaft, means supported on said shaft and movable radially outwardly and radially inwardly thereof to respectively expand and contract said reel, and a wedge member interposed between said means and said shaft and movable axially of the latter to effect radial movement aforesaid of said means, said wedge member having a radially inwardly directed wedge surface engaged with said shaft and a radially outwardly directed wedge surface engage with said means to increase the ratio between radial movement of said means and axial movement of said wedge member.

5. The construction of claim 4 wherein said shaft and said means each have surfaces complementary to and cooperable with respective wedge member surfaces.

6. The construction of claim 4 wherein said wedge member has interlocking engagement with both said shaft and said means to insure radial movement of the latter in response to wedge member axial movement.

7. The construction of claim 4 wherein said wedge member surfaces are oppositely inclined and wherein said wedge member is movable radially inwardly and radially outwardly of said shaft.

8. The construction of claim 7 wherein said means is restricted against movement axially of said shaft.

9. An expansible-contractable reel comprising an elongated, rotatably mounted shaft, means extending axially of and supported by said shaft and such means being movable radially outwardly and radially inwardly thereof to respectively expand and contract said reel, and a wedge member interposed between said means and said shaft and movable axially of the latter to effect radial movement aforesaid of said means, said wedge member having a pair of axially spaced, radially inwardly directed wedge surfaces engaged with said shaft and a pair of axially spaced, radially outwardly directed wedge surfaces engaged with said means, said surface pairs being inclined in opposite axial directions and increasing the ratio between radial movement of said means and axial movement of said wedge member.

10. The construction of claim 9 wherein said means comprises at least two arcuate members each forming a portion of the reel periphery and wherein there is a wedge member for each of said arcuate members.

11. The construction of claim 10 wherein each wedge member has interlocking sliding engagement with said shaft and with respective arcuate members to insure radial movement of the latter in response to wedge member axial movement.

12. An expansible-contractable reel comprising a rotatably mounted shaft, means supported on said shaft and movable radially outwardly and radially inwardly thereof to respectively expand and contract said reel, a wedge member interposed between said means and said shaft and movable both axially and radially of the latter to effect radial movement aforesaid of said means, actuating means movable axially of said shaft, and link means extending between and pivotally connecting said wedge member with said actuating means whereby axial movement of the latter effects wedge member movement aforesaid.

13. The construction of claim 12 wherein said wedge member has a radially inwardly directed wedge surface engaged with said shaft which causes radial movement of said wedge member during axial movement thereof.

14. The construction of claim 13 wherein said wedge member also has a radially outwardly directed wedge surface engaged with said first mentioned means, said wedge surfaces being inclined in opposite directions and cooperating to increase the ratio between radial movement of such means and axial movement of said wedge member.

15. The construction of claim 14 wherein said actuating means comprises an actuator member slidable axially within the interior of said shaft and an actuator sleeve slidable axially on the exterior of said shaft, wherein said sleeve is connected to said member for unitary movement therewith, and wherein said link means extends between said wedge member and said actuator sleeve.

16. An expansible-contractable reel comprising a cantilever supported, rotatably mounted shaft, means supported on said shaft and movable radially outwardly and radially inwardly thereof to respectively expand and contract said reel, a wedge member interposed between said means and said shaft and movable axially of the latter to effect radial movement aforesaid of said means, said wedge member having a radially inwardly directed wedge surface engaged with said shaft and inclined in one direction and a radially outwardly directed wedge surface engaged with said means and inclined in the opposite direction to increase the ratio between radial movement of said means and axial movement of said wedge member, an actuating sleeve slidable axially on the exterior of said shaft and disposed at the free end thereof, an actuator member slidable axially within the interior of said shaft and connected to said sleeve for effecting movement aforesaid thereof, and link means extending between and pivotally connecting said wedge member with said actuating sleeve whereby axial movement of the latter effects wedge member movement aforesaid.

17. An expansible-contractable reel rotatably supported at one end and free at its other end,
a tapered nose having a predetermined transverse periphery and disposed at the free end of said reel to facilitate entry of the latter into the eye of a coil to be supported thereon,
and means adjacent said nose and forming the reel periphery and being movable radially outwardly to positions beyond said nose transverse periphery to thus expand said reel into gripping engagement with the surface defining the eye of the coil into which it is inserted,
said means being movable radially inwardly to positions not exceeding said nose transverse periphery to thus contract said reel for insertion into the eye of the coil while obviating formation of a shoulder between said nose and said means which could snag upon the entry edge of the surface defining the eye of the coil during insertion of the reel thereinto.

18. The construction of claim 17 wherein said means comprises a plurality of reel segments extending axially of said reel and spaced circumferentially about the reel axis,
and wherein said nose is mounted for movement axially of said reel and in one direction of movement expands said reel and in the other direction of movement contracts said reel.

19. The construction of claim 18 wherein said segments and said tapered nose have adjoining toothed portions and wherein the teeth formed in said segments fit between the teeth formed in said tapered nose when said reel is contracted.

20. The construction of claim 19 wherein said segments are provided with first wedge surfaces and wherein said nose effects axial movement of second wedge surfaces in cooperable engagement with said first wedge surfaces to effect radial movement aforesaid of said segments upon axial movement of said nose.

21. The construction of claim 18 wherein said segments are provided with wedge surfaces, wherein said reel has a central, axially extending shaft, wherein axially shiftable wedge members are interposed between said segments and said shaft, wherein said wedge members have surfaces in cooperable engagement with said segment wedge surfaces, and wherein axial movement of said nose effects axial movement of said wedge members and consequent radial movement aforesaid of said segments.

22. The construction of claim 21 wherein said segment surfaces are directed radially inwardly of said shaft, wherein said wedge member surfaces cooperable with said segment surfaces are inclined in one direction and are directed radially outwardly of said shaft, wherein said wedge members also have radially inwardly directed wedge surfaces inclined in the opposite direction and, wherein said shaft carries radially outwardly directed wedge surfaces cooperably engaged with said inwardly directed wedge member surfaces, wherein said wedge members are movable radially inwardly and radially outwardly of said shaft during their axial movement, and wherein link means connects said wedge members with said nose.

23. The construction of claim 22 wherein said arcuate segments and said actuating means have adjoining toothed portions and wherein the teeth formed in said segments fit between the teeth formed in said nose when said reel is contracted.

24. The construction of claim 23 wherein adjoining marginal portions of said segments also have a toothed configuration and wherein the teeth along the margin of one segment fit between the teeth along the margin of the adjoining segment when said reel is contracted.

25. An expansible-contractable reel comprising a rotatably mounted shaft, a plurality of arcuate reel segments extending axially of said shaft and spaced circumferentially thereabout for cooperably forming the reel periphery, and means forming guide surfaces in part provided by respective arcuate segments and in part provided by said shaft along which said segments are movable radially outwardly and radially inwardly of said shaft to respectively expand and contract said reel.

26. The construction of claim 25 wherein said shaft provides longitudinally extending ribs underlying respective arcuate segments, wherein each rib provides transversely spaced, oppositely facing guide surfaces, and wherein each segment has transversely spaced, facing guide surfaces closely but slidably engaged with respective guide surfaces of respective ribs.

27. The construction of claim 26 wherein wedge members extend axially of said shaft, wherein each wedge member is interposed between said shaft and respective arcuate segments, wherein said wedge members are movable axially of said shaft to effect radial movement aforesaid of said segments, and wherein each wedge member is disposed between said guide surfaces of respective ribs aforesaid.

28. The construction of claim 27 wherein each of said ribs provides other guide surfaces between and along which respective wedge members aforesaid are axially movable.

References Cited by the Examiner
UNITED STATES PATENTS

| | | | |
|---|---|---|---|
| 2,564,482 | 8/1951 | Kentis | 242—72.1 |
| 2,989,263 | 6/1961 | Smeets | 242—72.1 |
| 3,116,891 | 1/1964 | Anderson et al. | 242—72.1 |

STANLEY N. GILREATH, *Primary Examiner.*

FRANK J. COHEN, *Examiner.*

N. L. MINTZ, *Assistant Examiner.*